S. Turner,
Derrick.
Nº 43,936.   Patented Aug. 23, 1864.
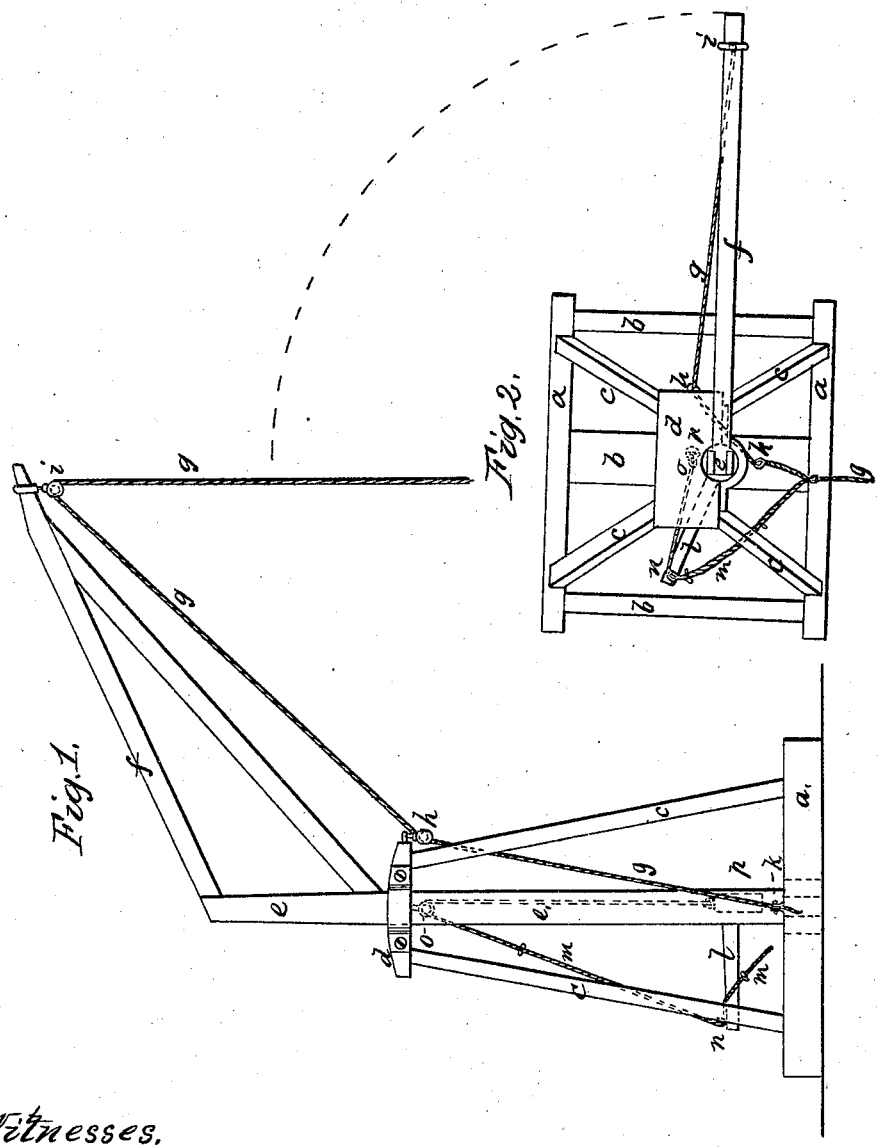
Witnesses.
J D Bennett
Charles H. Wood
Inventor
Seth Turner

UNITED STATES PATENT OFFICE.

SETH TURNER, OF ONARGO, ILLINOIS.

IMPROVEMENT IN DERRICKS FOR STACKING HAY.

Specification forming part of Letters Patent No. 43,936, dated August 23, 1864.

*To all whom it may concern:*

Be it known that I, SETH TURNER, of Onargo, in the county of Iroquois and State of Illinois, have invented, made, and applied to use a certain new and useful improvement in Derricks for Stacking Hay, &c.; and I do hereby declare the following to be a full, clear, and exact description of the same, reference being had to the annexed drawings, making part of this specification, wherein—

Figure 1 is an elevation of my said derrick, and Fig. 2 is a plan of the same.

Similar marks of reference denote the same parts.

The nature of my said invention consists in an arrangement of revolving derrick to which cords or ropes are applied in such a manner that the hay, elevated upon a fork or other device, is raised perpendicularly, and then the hay is swung around over the stack, rick, or cart and lowered onto the same, and then the derrick is swung back to its former position by the act of lowering the fork.

The whole apparatus is light and easily operated in the field, or moved from place to place.

In the drawings, $a\ a$ are sills united by cross-pieces $b\ b$ to form a frame. $c\ c$ are posts or studs forming a pyramidal frame that carries the cap-piece $d$, through which the vertical shaft $e$ passes, and is fitted with a round step at the bottom in $b$, so that said shaft may turn. $f$ is an arm extending out from the shaft $e$, and provided at the end with a pulley, $i$. The hoisting-rope $g$ passes through this pulley $i$ and also through the blocks or pulleys $h$ on the cap $d$ and $k$ on the frame $b$; thence to the animal employed for drawing up the load of hay or other material raised by a fork or other device on the end of the rope $g$. I provide an arm, $l$, extending from the shaft $e$ on the opposite side to the arm $f$, and $m$ is a rope passing through a block, $n$; thence over a pulley, $o$, on the under side of the cap $d$ to a weight, $p$, and the rope $m$ is attached to the rope $g$ or the animal at a suitable point.

The operation is as follows: On the animal moving the rope $g$ is drawn upon sufficiently to raise the load up perpendicularly, the rope $m$ drawing off and raising up the weight $p$. A knot or stop in the rope $m$ at a suitable point taking the pulley $n$ causes the arm $l$ to swing the derrick around to the desired point. The rope $g$ is then lowered sufficiently to discharge the load, the weight $p$ taking up the slack of the rope $m$, after which the fork is lowered for taking up another load, and the derrick is swung back to its former position by a knot or stop in the rope $m$ taking the other side of the pulley $n$ and causing the weight $p$ to draw said arm $l$ back to the position represented.

What I claim, and desire to secure by Letters Patent, is—

The arm $l$ and weight $p$, in combination with the ropes $m$ and $g$ and revolving derrick, for the purposes and as specified.

In witness whereof I have hereunto set my signature this 10th day of May, 1864.

SETH TURNER.

Witnesses:
 J. D. BENNETT,
 CHAS. H. WOOD.